T. BRETT.

Harvester.

No. 2,693.

Reissued July 23, 1867.

Witnesses:

Geo. Coombs

Geo. W. Rees

Inventor:

Thomas Brett per Munn & Co

Attorneys

United States Patent Office.

THOMAS BRETT, OF GENEVA, OHIO.

*Letters Patent No.* 40,601, *dated November* 17, 1863; *reissue No.* 2,693, *dated July* 23, 1867.

IMPROVEMENT IN HARVESTERS.

The Schedule referred to in these Letters Patent and making part of the same.

TO ALL WHOM IT MAY CONCERN:

Be it known that I, THOMAS BRETT, of Geneva, in the county of Ashtabula, and State of Ohio, have invented a certain new and useful Improvement in Applying Seats to Harvesters; and I do hereby declare that the following is a full and complete description of the same, reference being had to the accompanying drawings, making part of this specification, in which—

Figure 1:
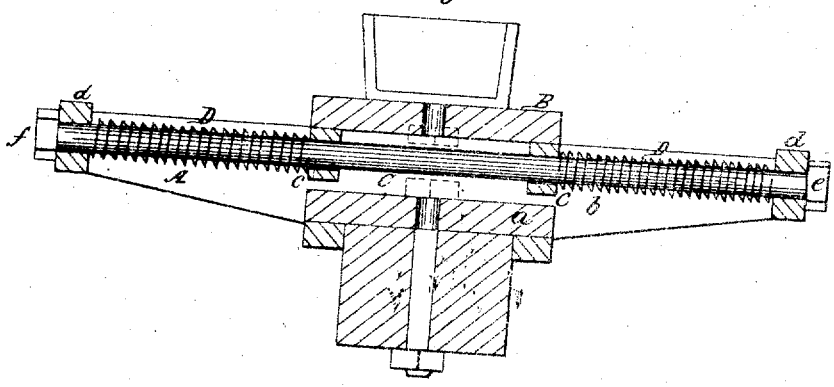
Figure 2:
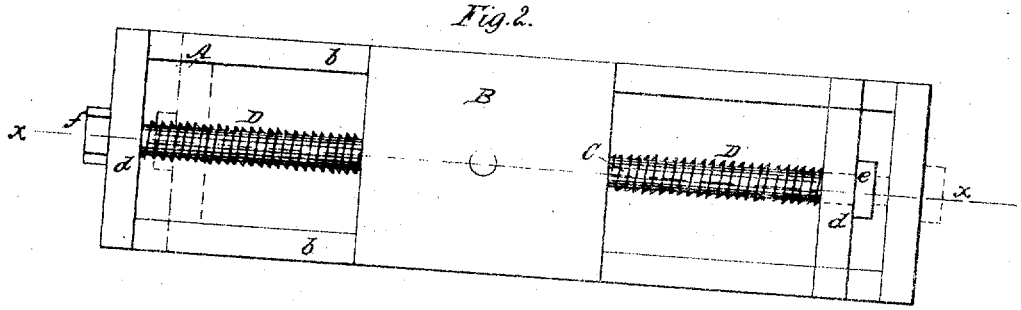

Figure 1 is a vertical section of my improvement, taken in the line *x x*, fig. 2.

Figure 2 a plan or top view of the same.

Similar letters of reference indicate corresponding parts in the two ngures.

The object of this invention is to apply a seat to a harvester, in such a way that the seat will not be subjected to the sudden movements and shocks or concussions produced by the harvester as it is drawn along, and the driver therefore not be liable as heretofore to be thrown from the seat. It will be evident that this invention admits of modification in its form, and the details of its construction.

To enable those skilled in the art to fully understand and construct my invention, I will proceed to describe it.

A represents a frame, which may be of rectangular or other suitable form, and which is secured to the frame of the harvester by means of a bolt passing centrally through a plate, *a*, attached to the centre of the bottom or lower part of the frame A. A spring or springs may if desired be interposed between the frame A and the harvester-frame, in order to form an elastic or yielding connection. On the frame A there is placed a plate, B, the front and back parts of which rest on the front and back bars *b b* of the frame A. This plate B has pendants *c c* attached to it, one at each end; said pendants projecting down between the bars *b b* of the frame A, and having a rod, C, passing through them, the ends of which pass through the ends *d d* of the frame A, one end of said rod having a head, *e*, and the other end having a screw-nut, *f*, upon it. On this rod C there are placed two spiral springs D D, the outer ends of which bear against the ends *d d* of the frame A, the inner ends bearing against the pendants *c c* of the plate B, as shown clearly in fig. 1. To the plate B the driver's seat is attached by a bolt, as shown in red in fig. 1. From the above it will be seen that the frame A will move laterally under the action of the harvester, as the latter is drawn along, said frame sliding under the plate B, the latter under the weight of the driver not moving materially, and not being subject to any jars or concussions by the lateral movements of the harvester. The springs D serve to steady the plate B, and retain it in position, the driver consequently will not be liable to be thrown from his seat; a contingency not unfrequently occurring in using the ordinary harvesters.

What I claim as my improvement, and desire to secure by Letters Patent, is—

1. So arranging the seat of harvesters that it may have a lateral movement upon a suitable frame or ways, in combination with one or more springs acting in concert with said seat, for the purpose specified.

2. The frame A attached to the harvester, in combination with the plate B and springs D D, all arranged to operate in the manner substantially as and for the purpose herein set forth.

THOS. BRETT.

Witnesses:

WM. H. MCEWEN,

F. A. PETTIBONE.